(12) United States Patent
Liao et al.

(10) Patent No.: US 8,077,908 B2
(45) Date of Patent: Dec. 13, 2011

(54) METHOD FOR USING AN IMAGE ANALYSIS PROGRAM TO ANALYZE A PLURALITY OF IMAGES HAVING THE SAME IMAGE BLOCKS

(75) Inventors: Chi-Jen Liao, Taipei (TW);
Tung-Hsuan Pai, Taipei (TW)

(73) Assignee: Primax Electronics Ltd., Taipei (TW)

( * ) Notice: Subject to any disclaimer, the term of this patent is extended or adjusted under 35 U.S.C. 154(b) by 1070 days.

(21) Appl. No.: 11/936,559

(22) Filed: Nov. 7, 2007

(65) Prior Publication Data

US 2008/0298715 A1    Dec. 4, 2008

(30) Foreign Application Priority Data

Jun. 1, 2007  (TW) .............................. 96119655 A

(51) Int. Cl.
*G06K 9/00*    (2006.01)
(52) U.S. Cl. ........ 382/100; 348/100; 348/112; 348/113; 348/114; 358/426.01; 358/426.02; 358/426.03; 358/426.04; 358/426.05

(58) Field of Classification Search .................. 382/100, 382/112–114; 348/61–69; 358/426.01–426.16
See application file for complete search history.

(56) References Cited

U.S. PATENT DOCUMENTS

| | | | | | |
|---|---|---|---|---|---|
| 4,774,569 | A | * | 9/1988 | Morton et al. | 348/107 |
| 5,077,678 | A | * | 12/1991 | Guttag et al. | 715/806 |
| 6,122,317 | A | * | 9/2000 | Hanami et al. | 375/240.16 |
| 6,964,373 | B2 | * | 11/2005 | Sasaki et al. | 235/435 |

* cited by examiner

*Primary Examiner* — Atiba O Fitzpatrick
(74) *Attorney, Agent, or Firm* — Kirton & McConkie; Evan R. Witt

(57) ABSTRACT

The present invention relates to an image analysis method for analyzing an image. By inputting starting point coordinates and ending point coordinates of individual image blocks contained in the image, an image block arrangement table is created. The image is analyzed according to the image block arrangement table.

6 Claims, 5 Drawing Sheets

| Image | Image block | Starting point coordinate (Coordinate of center of circle) | Ending point coordinate (Radius) | Block partitiote | |
|---|---|---|---|---|---|
| | | | | Long side | Short side |
| IA | 1 | (X11,11) | (X1n,Y1n)0 | | 0 |
| | 2 | (X21,21) | (X2n,Y2n) | 0 | 0 |
| | 3 | (X31,31) | (X3n,Y3n) | 5 | 3 |
| | 4 | (X41,41) | (X4n,Y4n) | 0 | 0 |
| | 5 | (X51,Y51) | R5 | 0 | 0 |
| IB | 1 | (X11,Y11) | (X1n,Y1n) | 0 | 0 |
| | 2 | (X21,Y21) | (X2n,Y2n) | 0 | 0 |
| | 3 | (X31,Y31) | (X3n,Y3n) | 5 | 3 |
| | 4 | (X41,Y41) | (X4n,Y4n) | 0 | 0 |
| | 5 | (X51,Y51) | R5 | 0 | 0 |
| IC | 1 | (X'11,Y'11) | (X'1n,Y'1n) | 0 | 0 |
| | 2 | (X'21,Y'21) | (X'2n,Y'2n) | 0 | 0 |
| | 3 | (X'31,Y'31) | (X'3n,Y'3n) | 5 | 3 |
| | 4 | (X'41,Y'41) | (X'4n,Y'4n) | 0 | 0 |
| | 5 | (X'51,Y'51) | R5 | 0 | 0 |

Fig. 5

METHOD FOR USING AN IMAGE ANALYSIS PROGRAM TO ANALYZE A PLURALITY OF IMAGES HAVING THE SAME IMAGE BLOCKS

FIELD OF THE INVENTION

The present invention relates to an image analysis method, and more particularly to an image analysis method for analyzing an image having different image block arrangement modes.

BACKGROUND OF THE INVENTION

Nowadays, digital image processing devices such as digital cameras, image scanners, image printers and the like are widely used for processing and outputting images. Ideally, the output images of the digital image processing devices are substantially identical to the real images. For example, it is important to discriminate whether the printed image outputted from the image printer is very close to the electronic image or whether the electronic image generated by the image scanner is very close to the manuscript image. That is, an image analysis method is needed to determine the difference between the output image and the real image. Generally, human visual recognition is a simple image analysis technique to directly determine the difference between the output image and the original image with the naked eyes. As known, the human visual recognition is both laboring and time-consuming. In addition, the human visual recognition is a very subjective judgment of the image difference. For efficiently analyzing large amounts of data, many image analysis techniques have been provided for the extraction of quantitative data from images. In this context, an image analysis program used for image analysis is illustrated.

Generally, the image to be analyzed is divided into a plurality of image blocks. According to the attributes of the individual image blocks, these image blocks are classified as picture blocks, text blocks and the like. For a designated image analysis program, the image with a specified image block arrangement mode may be analyzed. That is, this designated image analysis program fails to analyze the images with different image block arrangement modes. Please refer to FIG. 1, which is a schematic views illustrating three images with different image block arrangement modes. In FIG. 1, a first image IA, a second image IB and a third image IC are shown. The first image IA includes five image blocks 1, 2, 3, 4 and 5. The second image IB is obtained by rotating the first image IA through 90 degree. The third image IC includes the five image blocks 1, 2, 3, 4 and 5 with different location arrangement from the first image IA.

FIG. 2(a) is a schematic block diagram illustrating a concept of analyzing images by a conventional image analysis technique. As shown in FIG. 2(a), the first image analysis program PA is specialized in analyzing the first image IA, the second image analysis program PB is specialized in analyzing the second image IB and the third image analysis program PC is specialized in analyzing the third image IC. Please refer to FIGS. 1 and 2. For analyzing these images IA, IB and IC, the programmers should have previously written the position data about the five image blocks of the images IA, IB and IC into the image analysis programs PA, PB and PC, respectively. Accordingly, the image analysis programs PA, PB and PC may be used to analyze the images IA, IB and IC, respectively.

Although the second image IB is simply obtained from rotation of the first image IA, the first image analysis program PA may only analyze the first image IA rather than the second image IB if the influence of image rotation is not attached to the first image analysis program PA. For analyzing the second image IB, the second image analysis program PB specialized in analyzing the second image IB is indispensable or otherwise the first image analysis program PA is modified to take the image rotation into consideration. As known, modifying the first image analysis program PA is more difficult and time-consuming than writing the second image analysis program PB.

In a case that an image rotation command RC is added to the first image analysis program PA during the programmer edits the program, the first image analysis program PA may analyze the first image IA as well as rotated first image IA (i.e. the second image IB). The related concept of analyzing images is illustrated with reference to a schematic block diagram of FIG. 2(b). The first image analysis program PA including the image rotation command RC, however, still fails to analyze the rearranged image blocks 1~5 of the third image. On the other hand, a third image analysis program PC specialized in analyzing the third image IC should be additional written according to the rearranged image blocks 1~5 of the third image.

As previously described, the images with different image block arrangement modes are considered as different images by the image analysis programs. As a result, the images with different image block arrangement modes fail to be analyzed by a common image analysis program. Even if the image rotation command RC is added to the first image analysis program PA, only the first image IA and the second image IB can be analyzed. Under this circumstance, the third image IC or more images with different image block arrangement modes fail to be analyzed by the first image analysis program PA including the image rotation command RC.

By means of the conventional image analysis technique described above, many image analysis programs should be edited to analyze corresponding block arrangement modes of images. Such an image analysis technique is troublesome and inefficient. Therefore, there is a need of providing an image analysis method by using a single image analysis program to analyze images with different image block arrangement modes.

SUMMARY OF THE INVENTION

It is an object of the present invention to provide an image analysis method for analyzing an image having different image block arrangement modes according to an image block arrangement table.

In accordance with an aspect of the present invention, there is provided an image analysis method for analyzing multiple images with different image block arrangement modes. Each image includes a plurality of image blocks. Each image block has a starting point coordinate and an ending point coordinate. The image analysis method includes steps of inputting starting point coordinates and ending point coordinates of individual image blocks of the multiple images, recording the starting point coordinates and the ending point coordinates of individual image blocks of the multiple images into an image block arrangement table, and analyzing the multiple images according to the image block arrangement table.

Preferably, the image blocks are picture blocks.

Preferably, the image blocks are text blocks.

Preferably, the image blocks include picture blocks and text blocks.

The above objects and advantages of the present invention will become more readily apparent to those ordinarily skilled

BRIEF DESCRIPTION OF THE DRAWINGS

FIG. 5 schematically illustrates an image block arrangement table used in the present invention.

DETAILED DESCRIPTION OF THE PREFERRED EMBODIMENT

Figure 3:
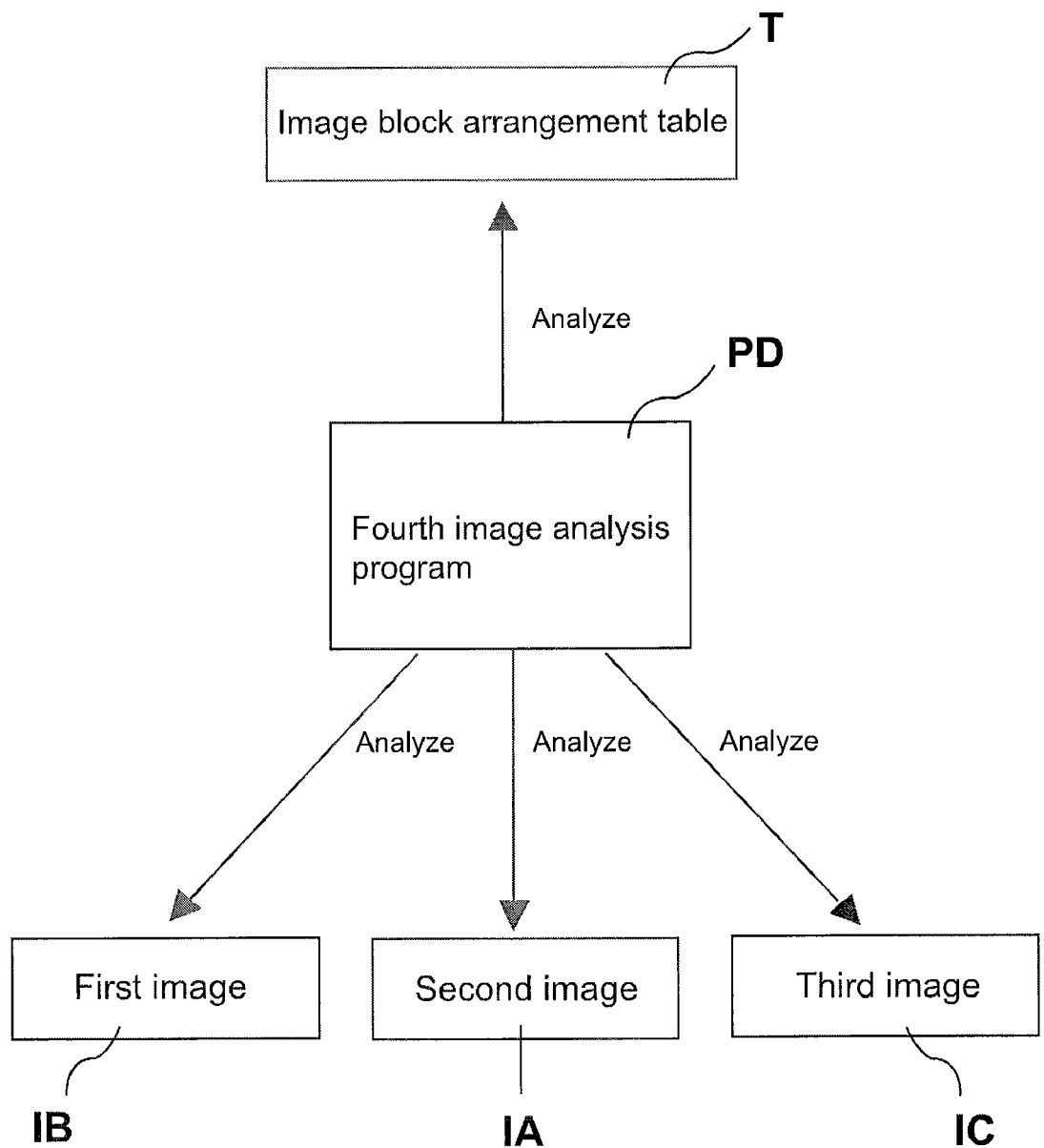
FIG. 3 is a schematic block diagram illustrating an image analysis method according to a preferred embodiment of the present invention.

For preventing the image analysis program from analyzing the image with a specified image block arrangement mode, the present invention provides an image analysis method for analyzing an image having different image block arrangement modes according to an image block arrangement table. The image block arrangement table includes the position data associated with multiple image blocks of an image to be analyzed. By referring to position data of the image block arrangement table, a single image analysis program is sufficient to analyze the image having different image block arrangement modes. FIG. 3 is a schematic block diagram illustrating a concept of analyzing images by an image analysis method according to a preferred embodiment of the present invention. As shown in FIG. 3, according to a predetermined image block arrangement table T, a fourth image analysis program PD is used to analyze the first image IA, the second image IB and the third image IC.

Figure 4:
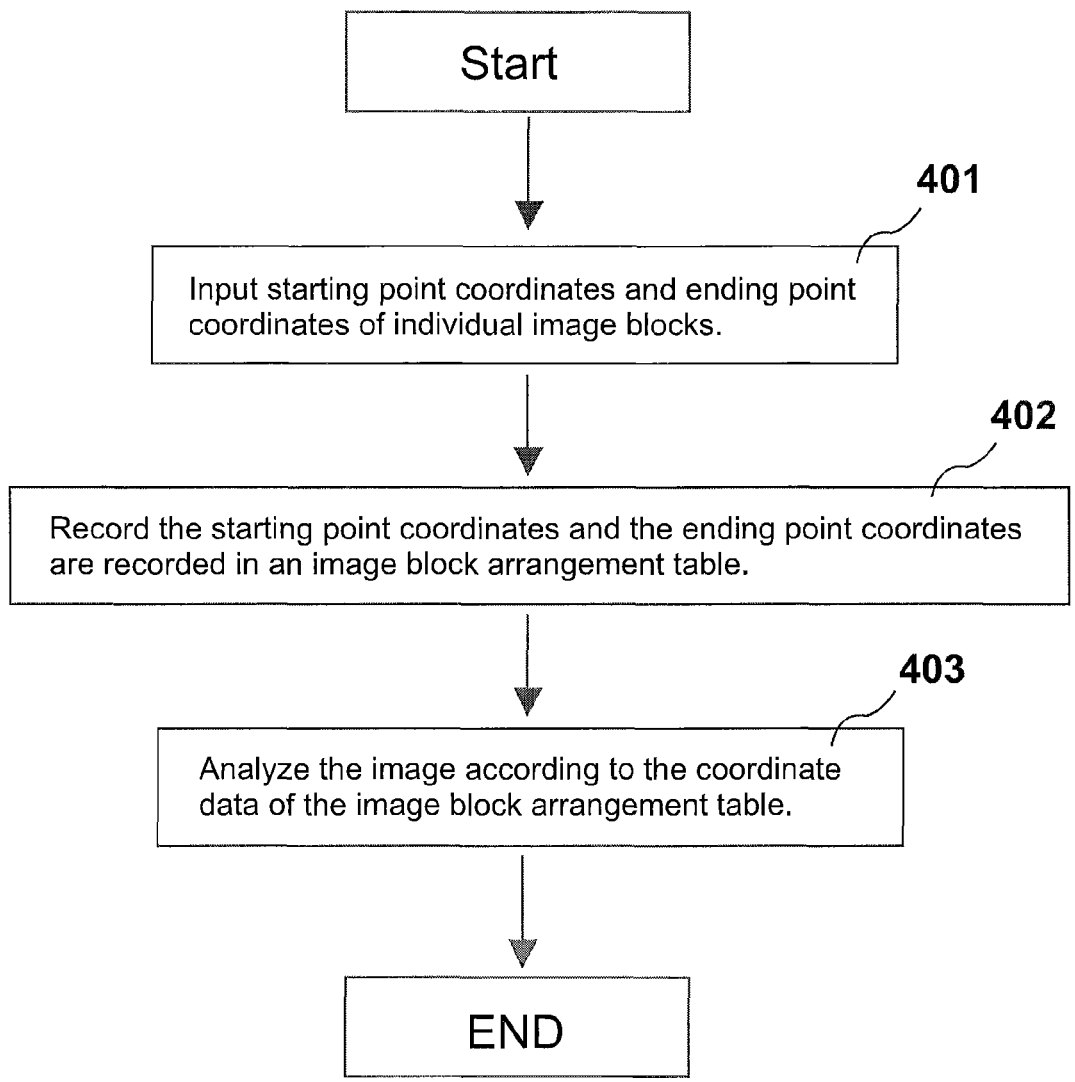
FIG. 4 is a flowchart illustrating the steps of implementing an image analysis method of the present invention.

FIG. 4 is a flowchart illustrating the steps of implementing an image analysis method of the present invention. First of all, starting point coordinates and ending point coordinates of individual image blocks of an image are inputted (Step 401). Next, the starting point coordinates and the ending point coordinates are recorded in the image block arrangement table T (Step 402). Afterwards, the image is analyzed according to the coordinate data of the image block arrangement table T (Step 403).

In the image analysis method of the present invention, the position data associated with individual image blocks of the image to be analyzed may have been previously recorded in the image block arrangement table T. According to the image block arrangement table T, the image is analyzed by the fourth image analysis program PD.

FIG. 5 schematically illustrates an image block arrangement table T used in the present invention. As shown in FIG. 5, the image block arrangement table T denotes several columns including for example designation of images, number of image blocks, starting point coordinates, ending point coordinates, and partition block number at the long side and the short side. In a case that the block shape is circular, the coordinate of the center of the circle is recorded in replace of the starting point coordinate, and the radius of the circle is recorded in replace of the ending point coordinate. In addition, if an image block is partitioned into several partition blocks, the partition block number at the long side and the partition block number at the short side are recorded. The present invention is illustrated by referring to the common block images having a circular shape or a rectangular shape. Nevertheless, the present invention can be applied to other block images having an arbitrary shape.

Figure 1:
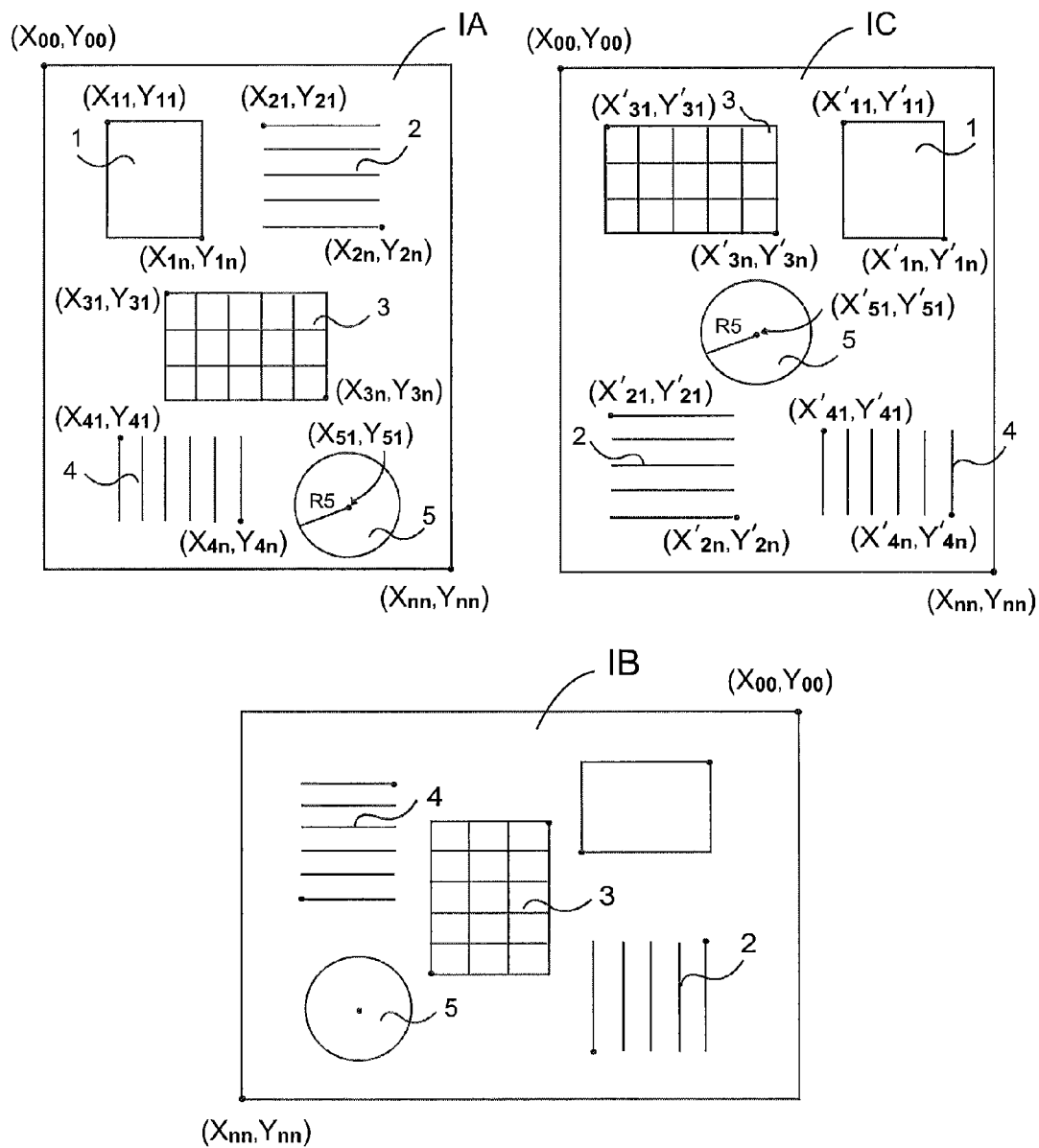
FIG. 1 is a schematic views illustrating three images with different image block arrangement modes.

Hereinafter, the image analysis method of the present invention will be illustrated in more details with reference to FIGS. 1 and 5. As shown in FIG. 1, the first image IA includes a first image block 1, a second image block 2, a third image block 3, a fourth image block 4 and a fifth image block 5. The first image block 1 and the fifth image block 5 are picture blocks, the second image block 2 and the fourth image block 4 are text blocks, and the third image block 3 is an image including several small partition blocks.

The first image IA has an origin coordinate $(X_{00}, Y_{00})$ at the left-upper-corner point thereof and an ending point coordinate $(X_{nn}, Y_{nn})$ at the right-lower-corner point thereof. On the basis of the origin coordinate and the ending point coordinate of the first image IA, the starting point coordinates and the ending point coordinates of individual image blocks are obtained. Meanwhile, the position data of individual image blocks may be inputted into the image block arrangement table T. For example, the position data of the first image block 1 include a first starting point coordinate $(X_{11}, Y_{11})$ and a first ending point coordinate $(X_{1n}, Y_{1n})$. The position data of the second image block 2 include a second starting point coordinate $(X_{21}, Y_{21})$ and a second ending point coordinate $(X_{2n}, Y_{2n})$. The position data of the third image block 3 include a third starting point coordinate $(X_{31}, Y_{31})$ and a third ending point coordinate $(X_{3n}, Y_{3n})$. The position data of the fourth image block 4 include a fourth starting point coordinate $(X_{41}, Y_{41})$ and a fourth ending point coordinate $(X_{4n}, Y_{4n})$. The position data of the fifth image block 5 include a coordinate of center $(X_{51}, Y_{51})$ and a radius $R_5$. Moreover, the position data of the third image block 3 further includes five small partition blocks at the long side, three small partition blocks at the short side and a total of fifteen small partition blocks. Moreover, if the ending point coordinate denotes a specified value, the specified value is deemed as a radius and the corresponding image block is a circular block.

In the above embodiment, the position data of individual image blocks are manually inputted into the image block arrangement table T. It is noted that, however, those skilled in the art will readily observe that numerous modifications and alterations of inputting the position data may be made while retaining the teachings of the invention. For example, as shown in FIG. 1, the first image IA also has an origin coordinate $(X_{00}, Y_{00})$ at the left-upper-corner point thereof and an ending point coordinate $(X_{nn}, Y_{nn})$ at the right-lower-corner point thereof. For inputting the position data of the first image block 1, the user may click and hold the left button of the mouse when the mouse cursor is located at the starting point of the first image block 1. Then, after the mouse cursor is dragged to the ending point of the first image block 1, the left button of the mouse is released. On the basis of the origin coordinate and the ending point coordinate of the first image IA, the image analysis program will determine the first starting point coordinate $(X_{11}, Y_{11})$ and the first ending point coordinate $(X_{1n}, Y_{1n})$ of the first image block 1. The rest (i.e. the second image block 2, the third image block 3, the fourth image block 4) may be deduced by analogy. For inputting the position data of the fifth image block 5, the user may click and hold the left button of the mouse when the mouse cursor is located at the center of the fifth image block 5. After the mouse cursor is dragged to the circumference of the fifth image block 5, the left button of the mouse is released and thus an option menu is shown for selection of rectangular or circular shape. By selecting the circular shape in the option menu, the position data of the fifth image block 5 are inputted. After the position data of all image blocks 1~5 are inputted, the image block arrangement table T as shown in FIG. 5 is generated.

Figure 2A:
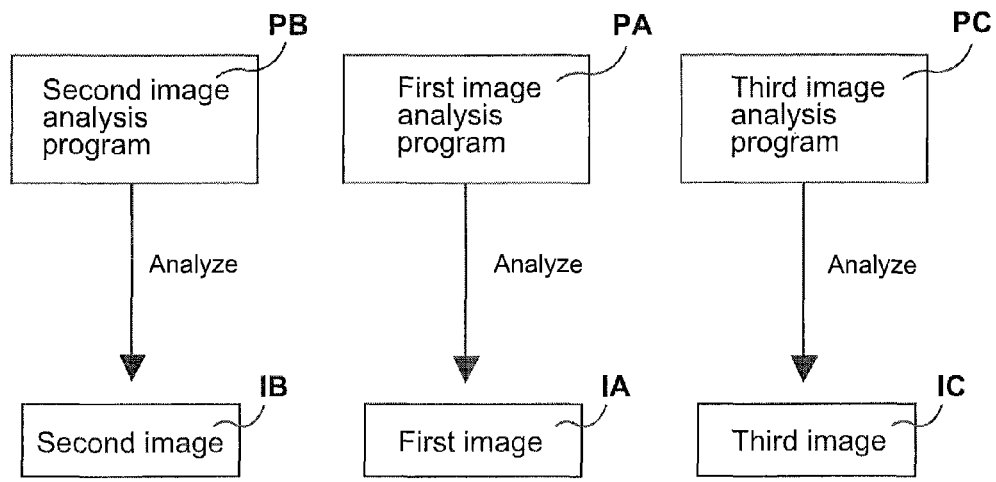
FIG. 2(a) is a schematic block diagram illustrating a conventional image analysis technique.
Figure 2B:
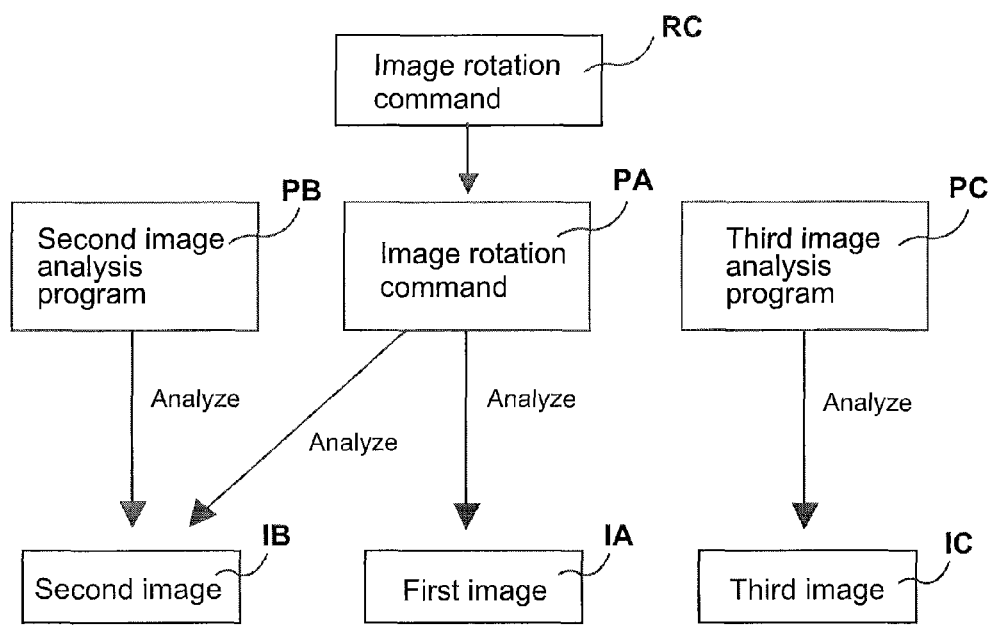
FIG. 2(b) is a schematic block diagram illustrating another conventional image analysis technique.

For a purpose of analyzing the first image IA, the position data of the first image IA in the image block arrangement table T is read out by the fourth image analysis program PD, thereby realizing the first image IA. For a purpose of analyzing the second image IB, the image rotation command RC as shown in FIG. 2(a) is no longer required to be added to the fourth image analysis program PD. Although the second image IB is obtained by rotating the first image IA through 90 degree, the origin coordinate ($X_{00}, Y_{00}$) and the ending point coordinate ($X_{nn}, Y_{nn}$) of the second image IB are identical to those of the first image IA. Even if the first image IA is rotated, the coordinate values of the image blocks 1~5 contained in the rotated first image IA (i.e. the second image IB) are kept unchanged with respect to the origin coordinate ($X_{00}, Y_{00}$). In other words, the position data of the image blocks 1~5 in the second image IB are the same as those of the first image IA upon reading the image block arrangement table T, as can be seen in FIG. 5. For a purpose of analyzing the third image IC, the image rotation command RC as shown in FIG. 2(a) is also not necessarily added to the fourth image analysis program PD. Before the image analysis, the image blocks 1~5 contained in the third image IC should be inputted. As shown in FIG. 1, the position data of the first image block 1 include a first starting point coordinate ($X'_{11}, Y'_{11}$) and a first ending point coordinate ($X'_{1n}, Y'_{1n}$). The position data of the second image block 2 include a second starting point coordinate ($X'_{21}, Y'_{21}$) and a second ending point coordinate ($X'_{2n}, Y'_{2n}$). The position data of the third image block 3 include a third starting point coordinate ($X'_{31}, Y'_{31}$) and a third ending point coordinate ($X'_{3n}, Y'_{3n}$). The position data of the fourth image block 4 include a fourth starting point coordinate ($X'_{41}, Y'_{41}$) and a fourth ending point coordinate ($X'_{4n}, Y'_{4n}$). The position data of the fifth image block 5 include a coordinate of center ($X'_{51}, Y'_{51}$) and a radius $R_5$. These position data are stored into the image block arrangement table T. Since the third image IC is obtained by rearranging the image blocks 1~5 of the first image IA, all coordinate values of the image blocks 1~5 contained in the rearranged first image IA (i.e. the third image IC) are changed except for the radius $R_5$. In other words, the position data of the image blocks 1~5 in the third image IC are different from those of the first image IA upon reading the image block arrangement table T, as can be seen in FIG. 5. Under this circumstance, according to the coordinate data of the image block arrangement table T, the third image IC is deemed as a different image from the first image IA by the fourth image analysis program PD.

The above concepts of the present invention may be extended to analyze more images with different image block arrangement modes. Similarly, the position data of these images should be previously inputted and stored in the image block arrangement table. According to these position data, these images may be analyzed by the image analysis program.

From the above description, the image analysis method of the present invention is capable of analyzing an image having different image block arrangement modes according to an image block arrangement table. The image is analyzed by using an image analysis program without the need of editing different designated image analysis programs for complying with specified image block arrangement modes. The present invention is illustrated by referring to three images as shown in FIG. 5. Nevertheless, the position data and the number of images may be modified as required. Moreover, with the proviso that the capacity of the memory is sufficient, the image block arrangement table may be expanded and the image types to be analyzed are increased. As a result, the image analysis method of the present invention is more convenient when compared with the conventional image analysis techniques.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for using an image analysis program to analyze a plurality of images having the same image blocks, the plurality of images comprising a first image and a second image and the first image comprising a first image block and a second image block and the second image comprising the first image block and the second image block, the method comprising:

generating an image block arrangement table for recording coordinates of the first image block and the second image block, wherein the position arrangement of the first image block and the second image blocks in the first image is different from the position arrangement in the second image, comprising:
inputting the position data of the image blocks of the first image and the second image;
recording the position data of the image blocks of the first image and the second image to the image block arrangement table;
when the first image is to be analyzed, using an image analysis program to read the position data of the first image block and the second image blocks of the first image and using the image analysis program to analyze the first image; and
when the second image is to be analyzed, using the image analysis program to read the position data of the first image block and the second image blocks of the second image and using the image analysis program to analyze the second image.

2. The method according to claim 1, wherein the first image block and the second image block are at least one of rectangular blocks, circular blocks or blocks consisting of a plurality of small partition blocks.

3. The method according to claim 2, when the first or second image block is a rectangular block, the position data of the first image block recorded in the image block arrangement table comprises a starting point coordinate and an ending point coordinate of the first image block.

4. The method according to claim 2, when the first or second image block is a circular block, the position data of the first image block recorded in the image block arrangement table comprises a center coordinate and radius of the first image block.

5. The method according to claim 2, when the first or second image block is comprised of a plurality of small partition blocks, the position data of the first image block recorded in the first image block arrangement comprises a starting point coordinate, an ending point coordinate, the number of the small partition blocks at a short side of the first image block and the number of the small partition blocks at a long side of the first image block.

6. The method according to claim 1, wherein the first and second image blocks are picture block or text block.

* * * * *